United States Patent
Beaven et al.

(10) Patent No.: US 7,185,345 B2
(45) Date of Patent: Feb. 27, 2007

(54) DATA PROPAGATION IN AN ACTIVITY SERVICE

(75) Inventors: John A. Beaven, Eastleigh (GB); Logan Colby, Rochester, MN (US); Alexandra Mulholland, Winchester (GB); Ian Robinson, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 10/175,617

(22) Filed: Jun. 20, 2002

(65) Prior Publication Data
US 2003/0236922 A1 Dec. 25, 2003

(51) Int. Cl.
G06F 3/00 (2006.01)
G06F 9/44 (2006.01)
G06F 9/46 (2006.01)
G06F 13/00 (2006.01)
G06F 15/16 (2006.01)
G06F 15/173 (2006.01)

(52) U.S. Cl. .................. 719/328; 719/315; 719/310; 709/201; 709/217; 709/219; 709/225; 709/226

(58) Field of Classification Search ............... 370/469; 719/319, 315, 328, 310; 709/201, 217, 219, 709/225–226
See application file for complete search history.

(56) References Cited

U.S. PATENT DOCUMENTS 6,728,267 B1 * 4/2004 Giese et al. ................ 370/469
6,766,323 B2 * 7/2004 Beaven et al. ............... 707/10

OTHER PUBLICATIONS

Brian Bennett et al., A distributed object oriented framework to offer transactional support for long running business processes., Springer-Verlag Berling Heidelberg 2000.*
Houston et al., "The CORBA Activity Service Framework for Supporting Extended Transactions," pp. 1-18.*
Wheater et al., "The CORBA Compliant Transactional Workflow System for Internet Applications," 1998, pp. 1-15.*
Wheater et al., "A CORBA Compliant Transactional Workflow System for Internet Applications," Sep. 1998, pp. 1-15.*
IBM et al., "Additional Structuring Mechanisms for the OTS Specification," Apr. 2000, pp. 1-86.*
Robinson, Ian "JSR 95: J2EE Activity Service for Extended Transactions," pp. 1-4.*

* cited by examiner

*Primary Examiner*—William Thomson
*Assistant Examiner*—Qing-Yuan Wu
(74) *Attorney, Agent, or Firm*—Roy W. Truelson

(57) ABSTRACT

The present invention provides a framework, such as an extension to the CORBA Activity Service, on which a service can propagate data with remote flows between processes. The service registers, with the framework, a requirement to be given the opportunity to propagate data with any outbound flow. As part of the registration the service specifies a name by which it is to be known. During processing of any outbound remote flow the framework creates a context, obtains data to propagate from the registered service, and adds the data and name of the service to the context for inclusion with the remote flow. In the receiving process the framework finds the name and data in the context and passes the data to a service registered with the same name. The framework may support a plurality of registered services in any given process.

25 Claims, 10 Drawing Sheets

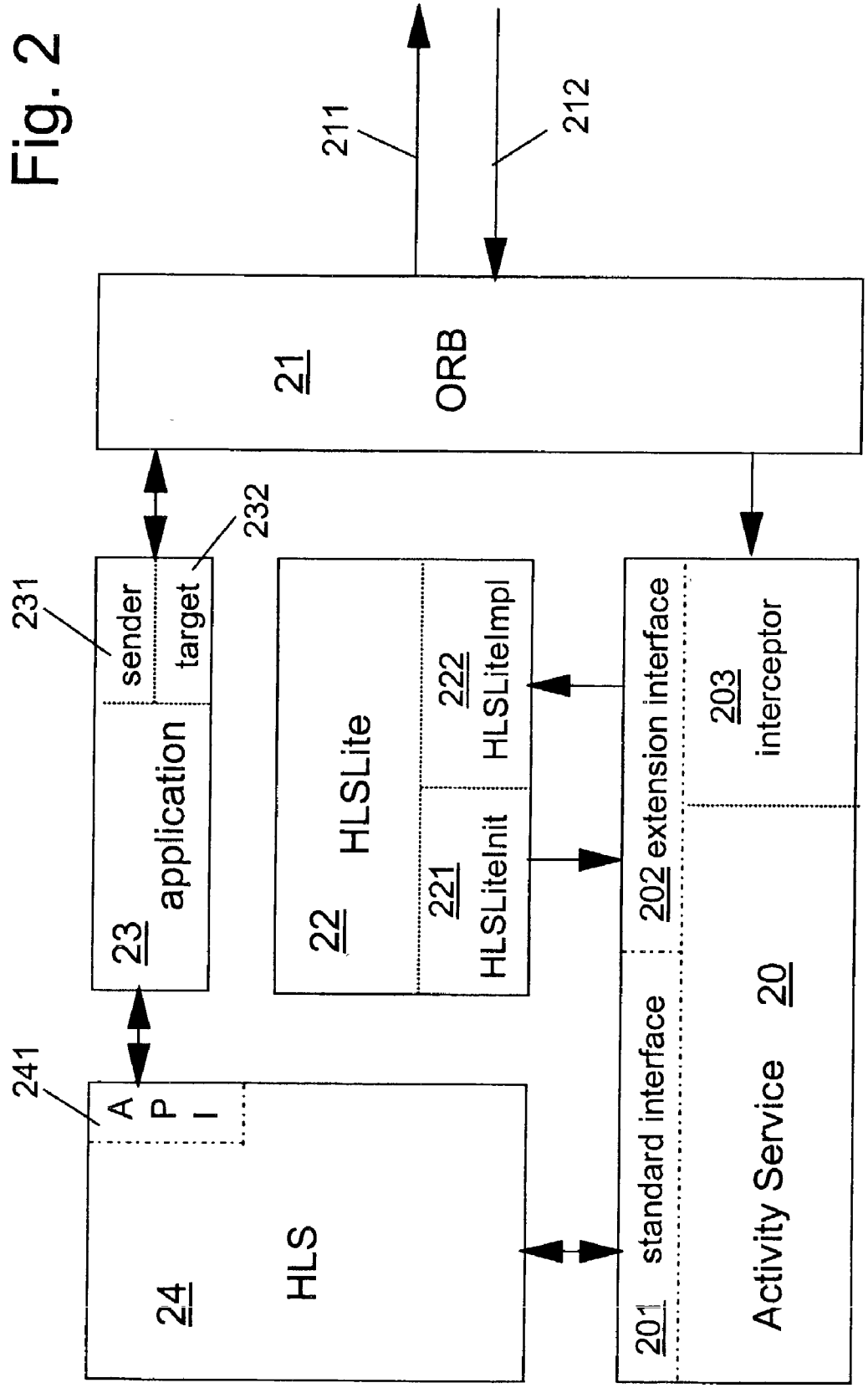

Fig. 3

```
public interface Hl SLiteDataInterface ———301
{
//=======================================================
// Method: HLSLiteDataInterface.getProperties
//=======================================================
public java.util.Properties getProperties();  ———302

//=======================================================
// Method: HLSLiteDataInterface.getRequestData
//        HLSLiteDataInterface.getResponseData
//=======================================================
public org.omg.CosActivity.PropertyGroupIdentity  getRequestData();  ———303
public org.omg.CosActivity.PropertyGroupIdentity  getResponseData();  ———304

//=======================================================
// Method: HLSLiteDataInterface.setRequestData
// Method: HLSLiteDataInterface.setResponseData
//=======================================================
public void  setRequestData(org.omg.CosActivity.PropertyGroupIdentity  newData);  ———305
public void  setResponseData(org.omg.CosActivity.PropertyGroupIdentity  newData);  ———306

//=======================================================
// Method: HLSLiteDataInterface.requestComplete
//=======================================================
public void  requestComplete();  ———307
}
```

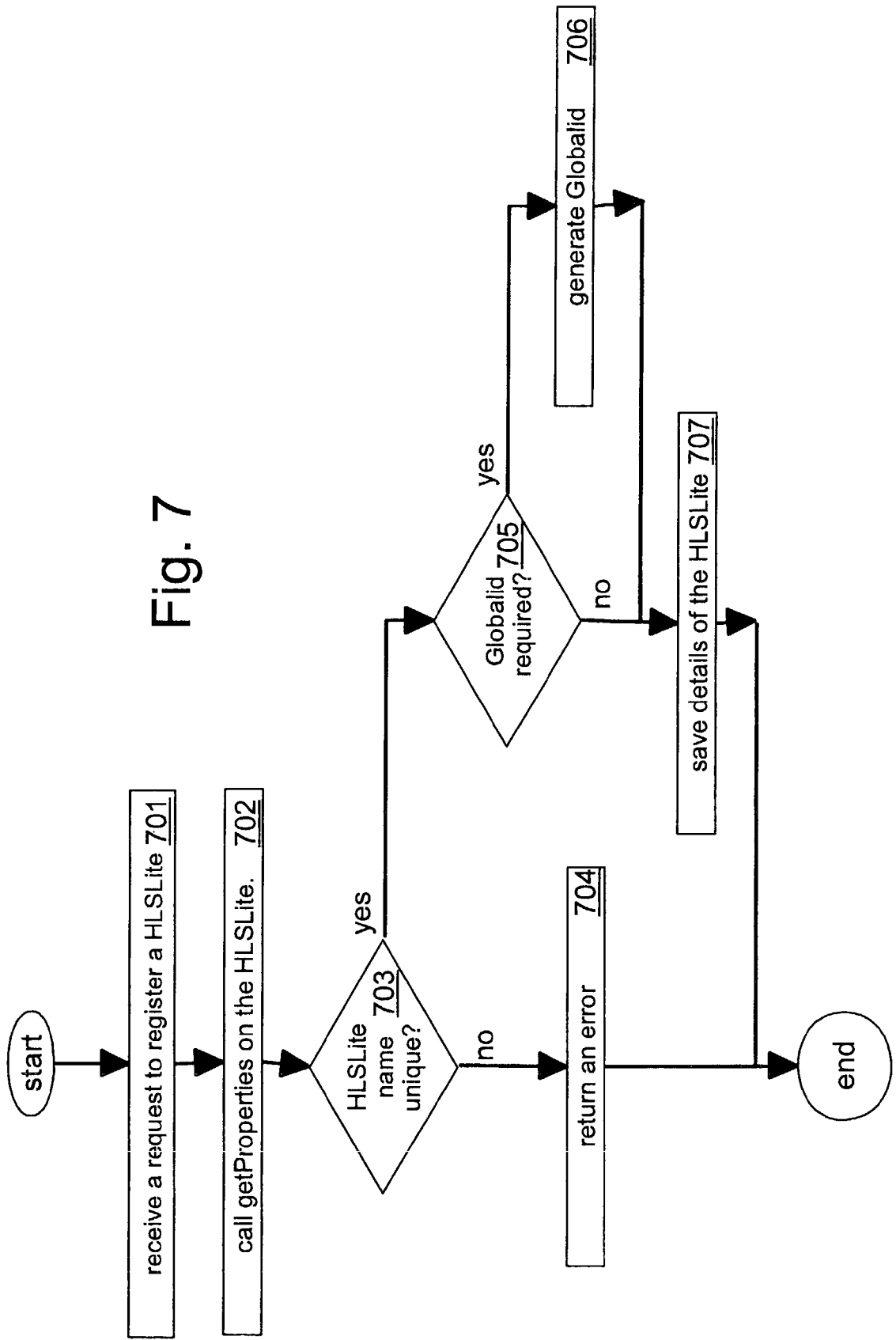

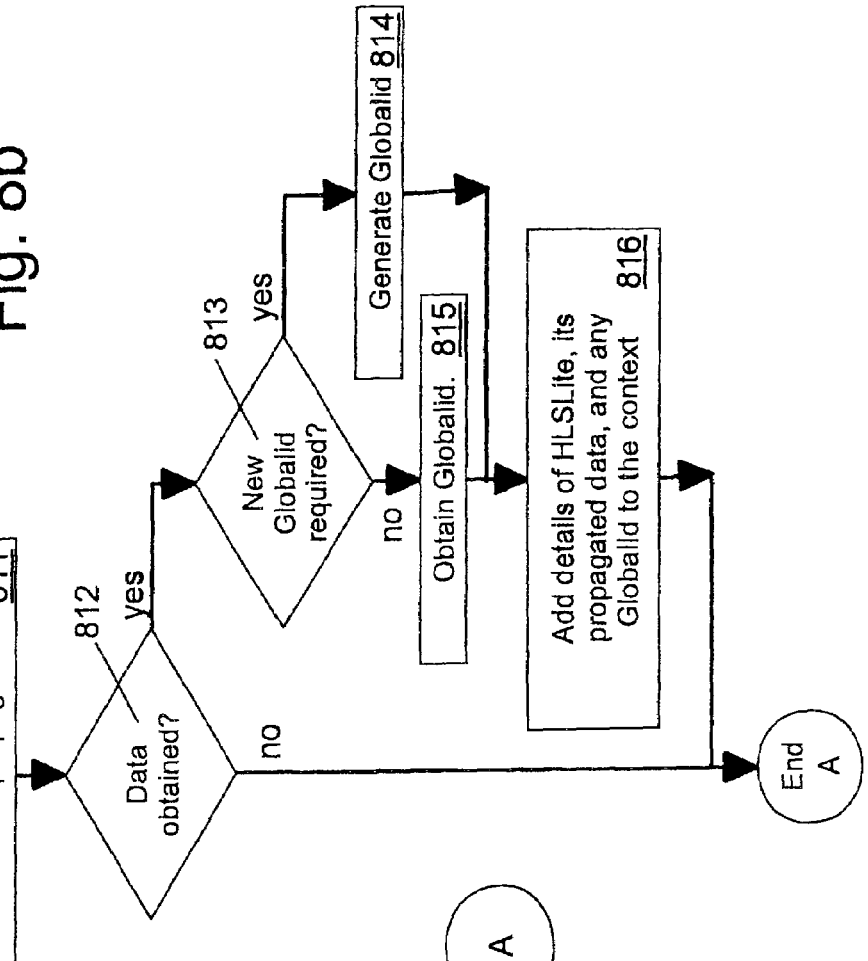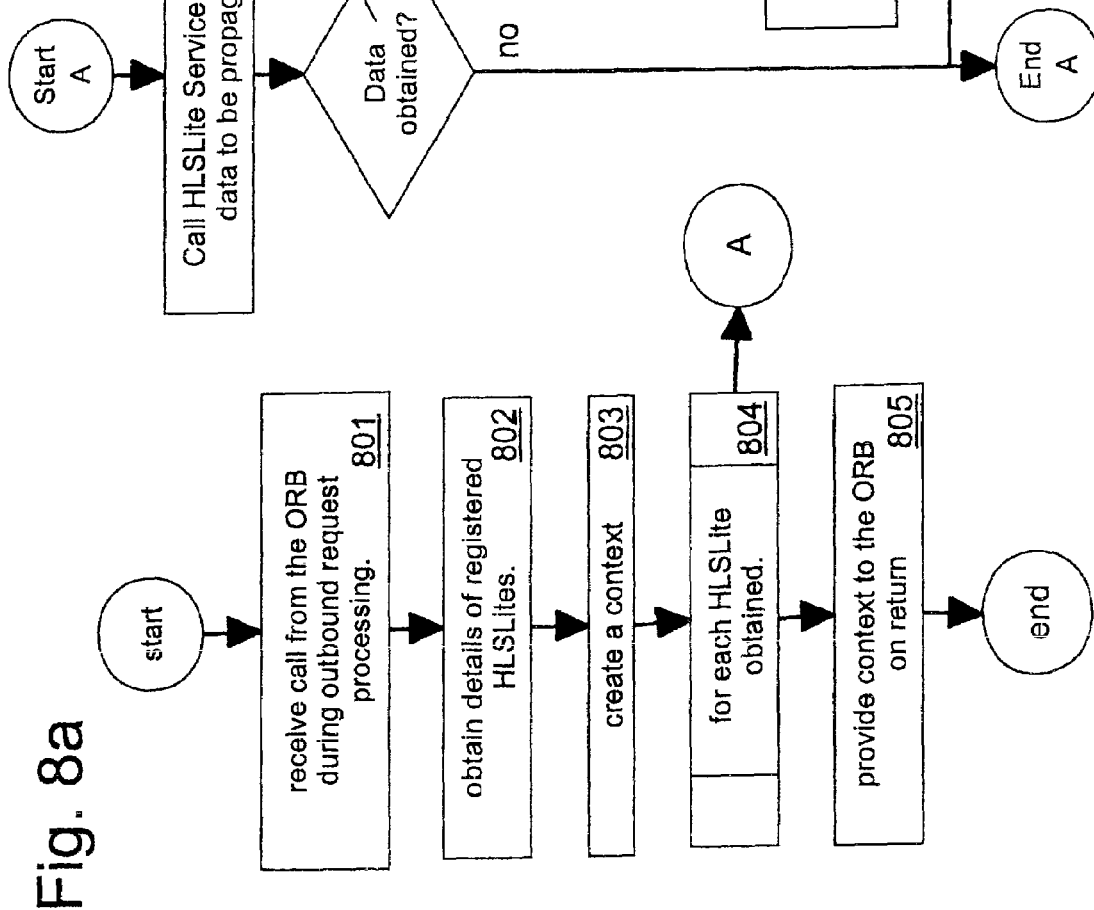

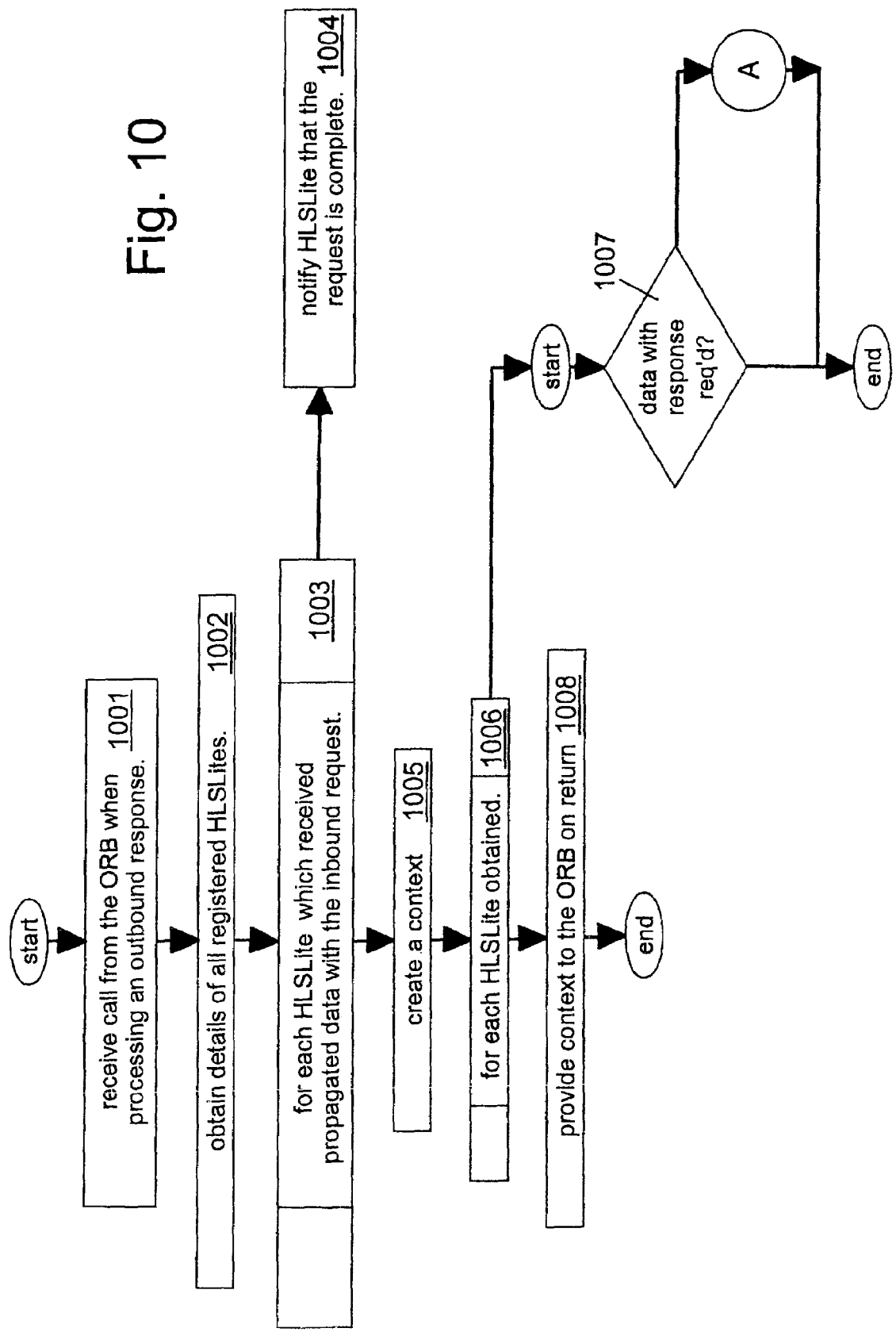

DATA PROPAGATION IN AN ACTIVITY SERVICE

FIELD OF THE INVENTION

The present invention relates to providing data propagation services in an Activity Service such as defined by the Object Management Group (OMG) and subsequently proposed for addition to Java™ 2 Platform, Enterprise Edition (J2EE™) by Java Specification Request (JSR) 95. Java and J2EE are registered trade marks of Sun Microsystems Inc.

BACKGROUND TO THE INVENTION

The concept of an Activity service arose from a requirement to support long running applications for which transactions with atomic, consistent, isolated, and durable (ACID) properties were unsuitable. The main problem with an ACID transaction being that resources accessed under the scope of the transaction remain locked, by the transaction, for the duration of the transaction. This unreasonably limits access to resources if the transaction remains active for an extended period of time. For example, in a widely distributed business process, perhaps involving web-based user interactions and cross-enterprise boundaries, it is neither practical nor scalable to hold resource locks for extended periods of time. As a result an Activity Service framework was defined by the Object Management Group (OMG) and subsequently added to Java 2 Platform, Enterprise Edition (J2EE) by Java Specification Request (JSR) 95-J2EE Activity Service for Extended Transactions, lead by Ian Robinson of IBM.

The purpose of the Activity service is to provide a middleware framework on which extended Unit of Work (UOW) models can be constructed. An extended UOW model might simply provide a means for grouping a related set of tasks that have no transactional properties or it may provide services for a long-running business activity that consists of a number of short-duration ACID transactions. The Activity service is deliberately non-prescriptive in the types of UOW models it supports. The advantage of structuring business processes as activities with looser semantics than ACID transactions, for example by modelling a business process as a series of short-duration ACID transactions within a longer-lived activity, is that the business process may acquire and hold resource locks only for the duration of the ACID transaction rather than the entire duration of the long-running activity.

The Activity service defines a generic middleware framework which provides functions such as UOW scoping and nesting management, context and data propagation with remote method requests, and inter-process signalling between propagated activity scopes. Higher Level Services (HLS), such as extended transactions and other unit of work models, can then be built on this framework, exploiting its functions.

However, whilst such HLSs tend to be fairly complex the Activity service can also be used to build other "lightweight" HLSs (HLSLites) which simply propagate data on remote method calls. The Activity service enables propagation of data without, for example, requiring a change to the remote method definition to add a new parameter, or to write the underlying support code to propagate the data. It is particularly useful if client-specific data needs to be propagated on all method calls from a given client to a remote target. For example, as J2EE evolves, more system services are being defined which have a need to propagate data with J2EE requests. Such HLSLites often provide a quality-of-service and the data they need to propagate may not be specific to the remote method call itself but may be related, for example, to the node from which the request originated (such as locale data) or the individual user that initiated the task (such as a userid). This data may not fit naturally into a scoped context (have no logical "begin" and "end" within the application method) and may not require nesting support, and as such will not require co-ordination or signalling functions. For example, the basic requirement may be the ability to send a single piece of data with every outbound request to a remote target (and perhaps to receive a piece of data on response) and because this requirement is that of a system service the data does not need to be exposed to the application programmer (in fact it is often desirable that it is not exposed). As a result it is undesirable for the data to be transported as a parameter on the request itself. The data may be identical for every request from a particular node (for example, the locale of that node), or there may be potentially different data sent for each request (such as data that is tracking the progress of a distributed request through the system). Further, there may be some requests for which no data needs to be sent.

However, whilst the Activity Service framework provides a base on which to implement such lightweight HLSs it introduces an unnecessary burden, in terms of complexity and performance, which results from being a framework which also provides a base for more complex UOW based services.

Note that in the J2EE environment, for example, as an alternative to using the Activity Service framework, system services are able to propagate data on IIOP requests through implementation of the org.omg.PortableInterceptor interface. Such an implementation is then invoked for every outbound and inbound request and response so that it can send and receive data. For a service that needs to send only a single string of data, though, implementation of its own interceptor introduces a considerable overhead which, if the Activity Service is used, is handled by the Activity Service. For example the system service would need to marshal data into CORBA data types, and more importantly, the format of the data that is sent (the "service context") has to be defined by the OMG if interoperable services are to be provided by different vendors. Further the service must be present on all nodes through which a request passes in order for the service context to be propagated with the request to all the nodes.

As a result neither the Activity Service nor the PortableInterceptor provide an ideal method for a HLSLite to propagate data and there is therefore a need to provide an alternate framework, or an extension to the Activity service framework, which reduces the burden for lightweight HLSs which do not require all of the facilities of the Activity Service and for which a PortableInterceptor provides an inadequate and/or too complex solution.

SUMMARY OF THE INVENTION

Accordingly, according to a first aspect the present invention provides a method for propagating data by means of an intermediate service in a data processing apparatus comprising: an application for initiating outbound flows to a remote entity; the intermediate service; a delivery mechanism for processing outbound flows from the application and for notifying the intermediate service of each outbound flow; an auxiliary service, registrable with the intermediate service, for providing the data to be propagated with outbound flows; the method comprising the steps of: receiving a registration request from the auxiliary service, the request comprising a name to be associated with the auxiliary service, wherein the registration indicates that the auxiliary service requires to be called during outbound flow processing; receiving a plurality of notifications, from the delivery mechanism, each notification relating to an outbound flow; and responding to each notification by: creating a context; calling the auxiliary service to request data to be propagated; adding the name associated with the auxiliary service and any data returned from the calling step to the context; and providing the context to the delivery mechanism for inclusion with the outbound flow.

Accordingly according to a second aspect the present invention provides an intermediate service system for propagating data in a data processing apparatus comprising: an application means for initiating outbound flows to a remote entity; the intermediate service system; a delivery mechanism means for processing outbound flows from the application and for notifying the intermediate service system of each outbound flow; an auxiliary service means, registrable with the intermediate service, for providing the data to be propagated with outbound flows; the intermediate service system comprising: means for receiving a registration request from an auxiliary service means, the request comprising a name to be associated with the auxiliary service, wherein the registration indicates that the auxiliary service means requires to be called during outbound flow processing; means for receiving a notification, from the delivery mechanism means, of an outbound flow; and means, for responding to each notification received by: creating a context; calling the auxiliary service means to request data to be propagated; adding the name associated with the auxiliary service and any data returned from the calling step to the context; and providing the context to the delivery mechanism means for inclusion with the outbound flow.

Thus the invention provides a framework (intermediate service) which enables an auxiliary service to propagate data with an outbound flow to a remote target. The outbound flows could comprise request flows or response flows or both. Note that a single registration from the auxiliary service results in it being provided with an opportunity to propagate data with any outbound flow, of which the method is notified by the remote delivery mechanism, for the lifetime of the process. Further note that the adding step is not responsive to data actually being obtained from the call to the auxiliary service and therefore the name associated with the auxiliary service can be added to the context with no or null data. However, optionally the step of adding the name and obtained data to the context is further responsive to actually obtaining data from the auxiliary service. As a result information relating to the auxiliary service is not added to the context if the auxiliary service does not provide data to be propagated.

Preferably the intermediate service also provides an option for the auxiliary service to specify whether or not it requires an opportunity to propagate data with outbound response flows. To enable this, the intermediate service can obtain properties from the auxiliary service where the properties contain an indication of whether or not the auxiliary service requires to propagate data on response flows. As a result, in the situation where the remote flow is a response flow, the intermediate service will only call the auxiliary service to obtain data for adding to the context if the properties obtained from it indicate that this is a requirement.

Optionally, if the outbound flow is a response flow, the intermediate service also calls the auxiliary service to inform it of the response flow. This enables the service to know when any data it received on the request flow, to which this response flow is a reply, becomes stale.

Further the auxiliary service may require to flow a unique identifier with each outbound request flow, for example a CORBA defined globalId. This is useful if the auxiliary service is propagating data to an implementation of the auxiliary service which requires to uniquely identify each request flow. To enable this, optionally the intermediate service can further obtain properties from the auxiliary service where the properties contain an indication of whether or not the auxiliary service requires a unique identifier to be generated and added to the context for inclusion with each request flow. As a result in the situation where the remote flow is a request flow the intermediate service creates a unique global id and adds it the context if the properties indicate that this is a requirement. Further note that if this option is implemented in addition to option of obtaining properties which contain an indication of whether or not the auxiliary service requires to propagate data on response flows, both properties may be obtained at the same time.

Preferably the intermediate service further supports a plurality of auxiliary services each of which can propagate data with a single outbound flow. In this case a registration request must be received from each of the plurality of auxiliary services and each auxiliary service must be called to request data to be propagated with each flow. Any data returned by an auxiliary service is then added, with the name of the service, to the context. As a result a single context will contain the name and propagated data of a plurality of auxiliary services. Further if obtaining details of whether or not the auxiliary service requires to propagate date with response flows and/or whether or not a unique identifier should be generated and included with each request flow are supported, these would be supported and acted upon for each of the plurality of auxiliary services.

According to a third aspect the present invention provides a method for receiving propagated data by means of an intermediate service in a data processing apparatus comprising: an application for receiving inbound flows from a remote entity; the intermediate service; a delivery mechanism for processing inbound flows for the application and for notifying the intermediate service of each inbound flow; an auxiliary service, registrable with the intermediate service, for receiving data propagated with inbound flows; the method comprising the steps of: receiving a registration request from the auxiliary service, the request comprising a name to be associated with the auxiliary service, and wherein registration indicates that the service requires to be called during inbound flow processing; receiving a plurality of notifications, from the delivery mechanism, each notification relating to an inbound flow and comprising a context; and responding to each notification by: searching the context for the name associated with the auxiliary service; and responsive to finding the name associated with the auxiliary service: obtaining data associated with the name from the context; and calling the auxiliary service and, as part of the call, passing to the service the data obtained from the context;

According to a fourth aspect the present invention provides an intermediate service system for receiving propagated data in a data processing apparatus comprising: an application means for receiving inbound flows from a remote entity; the intermediate service system; a delivery mechanism means for processing inbound flows for the application and for notifying the intermediate service system of each inbound flow; an auxiliary service means, registrable with the intermediate service, for receiving data propagated with inbound flows; the intermediate service system comprising: means for receiving a registration request from an auxiliary service means, the request comprising a name to be associated with the auxiliary service, wherein the registration indicates that the auxiliary service means requires to be called during inbound flow processing; means for receiving a notification, from the delivery mechanism means, of an inbound flow; and means, for responding to each notification received by: searching the context for the name associated with the auxiliary service; and responsive to finding the name associated with the auxiliary service: obtaining data associated with the name from the context; and calling the auxiliary service means and, as part of the call, passing to the auxiliary service means the data obtained from the context;

Thus an auxiliary service can receive data propagated with an inbound flow from a remote sender according to the first and second aspects of the present invention. The inbound flow could be a request, a response, or both. The intermediate service passes to the auxiliary service propagated data if data included in the context propagated with the request is associated with the same name as was obtained from the auxiliary service. However, note that according to the first and second aspects of the present invention the name of an auxiliary service can be added to a context with null or no data. In this case the service is called with null or no data.

Note that the intermediate service does not call the auxiliary service if the context does not contain the name obtained from the auxiliary service. However it could be useful to an auxiliary service to know that a remote flow has arrived. Optionally the intermediate service further calls the service, if the name was not found in the context, with a indication that no data was found for it in the context.

Preferably the intermediate service supports a plurality of auxiliary services each of which can receive data propagated with a single inbound flow. In this case a registration request must be received from each of the plurality of auxiliary services and the received context from each notified inbound flow must be checked for the names of each registered auxiliary service. For each registered service name found in the context the intermediate service calls the appropriate auxiliary service and the propagated data associated with its name passed as part of the call.

Preferably the intermediate service of the first, second, third or fourth aspects of the present invention is provided as an extension of an Activity Service which specifies use of a CORBA Activity Service context. The auxiliary service may then be considered a High Level Service implemented on the provided Activity Service.

Preferably the remote delivery mechanism is an Object Request Broker (ORB). Preferably any information added to the context is added in a marshalled form in which it is placed in contiguous storage together with an indication of its data type and optionally its length.

Finally, according to a fifth aspect the present invention provides a computer program product comprising instructions which, when executed on a data processing host, cause the host to carry out a method according to the first or third aspects and any disclosed variants thereof.

BRIEF DESCRIPTION OF THE DRAWINGS

The invention will now be described, by way of example only, with reference to a preferred embodiment thereof, as illustrated in the accompanying drawings, in which:

FIG. 2 is a schematic diagram of the various components of a process, and their interactions, which comprise the preferred embodiment of the present invention;

FIG. 3 is a specification of an interface to be implemented by a Lightweight High Level Service (HLSLite) according to the preferred embodiment of the present invention;

FIG. 7 is a flow diagram of a method followed by the Activity Service during registration of a HLSLite in a process;

FIG. 8a is a flow chart of a method followed by the Activity Service during the processing of an outbound request;

FIG. 8b is a flow chart of a method followed by the Activity Service, for each registered HLSLite, during outbound request processing (according to FIG. 8a) and during outbound response processing (according to FIG. 10);

FIG. 10 is a flow chart of a method followed by the Activity Service during processing of an outbound response.

Note that in the figures, where a like part is included in more than one figure, where appropriate it is given the same reference number in each figure.

DESCRIPTION OF THE PREFERRED EMBODIMENT

Figure 1:
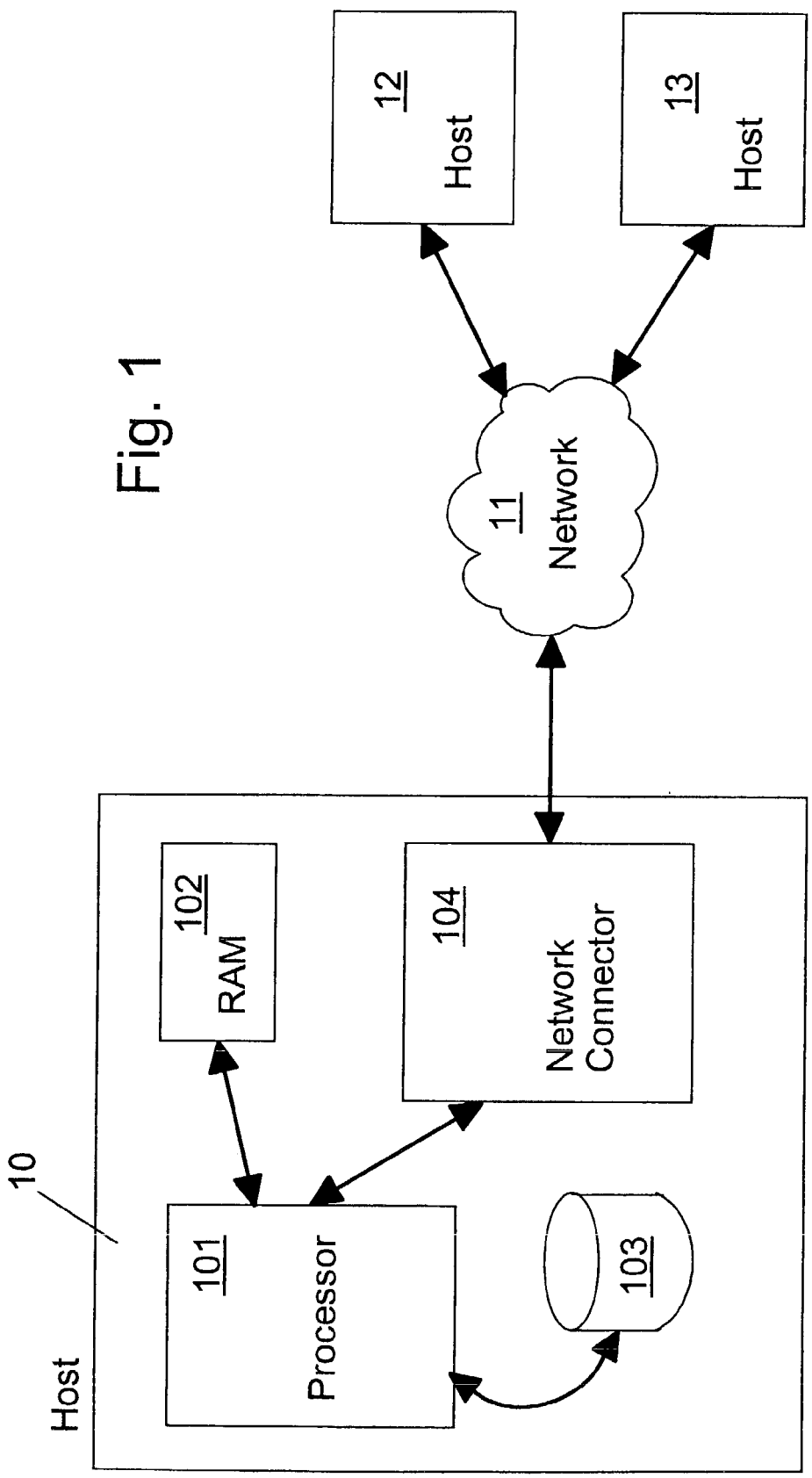
FIG. 1 is a block diagram of a data processing environment in which the preferred embodiment of the present invention can be advantageously applied.

FIG. 1 is a block diagram of a data processing environment in which the preferred embodiment of the present invention can be advantageously applied; In FIG. 1, a client/server data processing host 10 is connected to other client/server data processing hosts 12 and 13 via a network 11, which could be, for example, the Internet. A High Level Service (auxiliary service) which is based on an Activity Service implementation (intermediate service) and which propagates data, for example, via an Object Request Broker (delivery mechanism) on application IIOP (Internet Inter-Orb Protocol) requests, may be installed on any such client/server. A client/server on which the High Level Service is installed comprises at least one process in which the High Level Service executes. The High Level service may communicate with High Level Services executing on a different process in the same or a different client/server. Client/server 10 has a processor 101 for executing programs that control the operation of the client/server 10, a RAM volatile memory element 102, a non-volatile memory 103, and a network connector 104 for use in interfacing with the network 11 for communication with the other client/servers 12 and 13.

Note that the Activity service defines a generic middleware framework which provides functions such as UOW scoping ("begin/end" logic) and nesting management, context and data propagation with remote method requests, and inter-process signalling between propagated activity scopes. However, a HLSLite which only requires to propagate data has no requirements for functions such as UOW scoping ("begin/end" logic) and nesting management context. As a result, whilst the Activity Service provides a method of propagating data in a manner required by a HLSLite, it was not defined for such relatively simple services and its use for this purpose has some disadvantages, for example:

For data to be propagated with a request, an activity context has to be begun on the thread and the data set into a property group associated with that activity-this means that the service has to ensure that it is invoked on every request thread, before any remote requests are made.

Having to begin an activity context, and to create a property group object to hold the data, for each request thread, incurs a performance overhead for no associated benefit as context demarcation is not required.

Accordingly the present invention discloses a method for enabling a HLSLite to propagate data in a manner which avoids these disadvantages. In the preferred embodiment the present invention is implemented as an extension to a base Activity Service implementation which is compliant with the J2EE Activity Service framework as proposed in JSR 95. To be compliant it provides an implementation of JSR 95 specified functionality through specified Application Programming Interfaces (APIs).

Accordingly FIG. 2 shows a schematic diagram of the various components in a process, and their interactions, which comprise the preferred embodiment of the present invention. An Activity Service implementation (20) comprises: an implementation of the standard interface (201) which provides the Activity Service API according to JSR 95; an extension interface (202) which provides an extension to the standard Activity Service interface according to the preferred embodiment of the present invention; and an interceptor object (203) which interfaces with an ORB (21) and a HLSLite (22) via the extension interface (202). The ORB (21) is the delivery mechanism for remote flows. The HLSLite implementation (22) comprises a HLSLiteInit object (221) and a HLSLiteImpl object (222), although these could be implemented as a single object. The HLSLiteInit object (221) is used to initialise the HLSLite (22) and during initialisation it calls the Activity service (20) via the extension interface (202) to register. The HLSLiteImpl object (222) implements the HLSLite side of the Activity Service extension interface through which the Activity Service (20) and Activity Service interceptor (203) communicate with the HLSLite (22). An application program (23) is shown which comprises a sender object (231) and a target object (232), although these could be implemented as a single object. The sender object (231) sends outbound requests to, and receives inbound responses from, a remote application via the ORB (21). The target object (232) receives inbound requests from, and sends outbound responses to, a remote application via the ORB (21). As part of processing an outbound request/response the ORB (21) calls the Activity Service interceptor (203) prior to sending the remote outbound flow (211). Similarly as part of processing a remote inbound flow (212) the ORB (21) calls the Activity Service interceptor (203) prior to delivering the inbound request/response to the application sender object (231) or target object (232). Finally, the figure shows a prior art full HLS implementation (24) although this is not required for the preferred embodiment. This comprises an API, (241) through which the application can invoke functions of the HLS such as starting and ending Units of Work. The HLS (24) communicates with the Activity Service (20) through its standard interface (201). Note that FIG. 2 shows only one HLSLite implementation (22) and one Application (24) although there could be many of these in a process. Further note that any application in the process may comprise either a target object or a sender object or both.

The preferred embodiment therefore contains a "lightweight" High Level Service (HLSLite) which is implemented based on an Activity Service implementation which has been extended according to the present invention. The HLSLite is to be used to propagate data with application requests between processes in a network such as illustrated in FIG. 1. The data is to be propagated transparently with respect to the application and the Activity Service functions are obtained through a specified extension interface. Examples of such HLSLites are a security service that requires to propagate client id and password on a remote request, or a locale service which, for example, requires to propagate a natural language specification with a request.

Thus, according to the preferred embodiment of the present invention, the Activity Service supports an extension interface that enables a HLSLite to propagate data with an application request. This extension defines an interface which must be implemented by a HLSLite which wishes to use a data propagation-only function of the Activity service. The interface, according to the preferred embodiment, is illustrated in FIG. 3 which shows the definition of a HLSLiteDataInterface (301) interface. The interface defines 6 methods which are implemented by the HLSLite:

getProperties (302)—Called by the Activity service when the implementation of the HLSLiteDataInterface is registered with the Activity Service. The HLSLite returns a Properties object which contains an indication of its specific requirements on the activity service. In the preferred embodiment the recognised properties are:

newGlobalId="true"/"false"; default is "true". If this value is set to "true", the Activity Service will generate a unique globalId each time data is propagated for this service. A globalId may, for example, comprise a time stamp, a name associated with the process in which it was generated, and an integer which is incremented for each new globalId generated in a process. If the value is "false" then a single globalId will be generated on service registration and used for every request on which the service propagates data for the service from the current process. A new globalId for each request is required, for example, if an HLS wishes to be compliant with the OMG spec and/or a HLS is implemented as an HLSLite in a client process, but as a fully functional HLS which uses standard functionality of the Activity Service in the receiving process:

returnData="true"/"false"; default is false. If this value is set to "true", the Activity Service will call "getResponseData" when processing an outbound response to a remote request and "setResponseData" when processing an inbound response to a remote request. If the value is set to false "getResponseData" and setResponseData", as appropriate, are not called.

A null return from the method indicates that the HLSLite requires default behavior. Note that in other embodiments support for getProperties may be omitted or may provide support for different properties.

getRequestData (303)—Called by the Activity Service when processing an outbound request to a remote target. The method returns the data to be propagated with the request or null if no data is to be propagated.

getResponseData (304)—Called by the Activity Service, if specified in the Properties returned from getproperties, when processing an outbound response to a request from a remote sender. The method returns the data to be propagated with the response or null if no data is to be propagated.

setRequestData (305)—Called by the Activity service when processing an inbound request from a remote sender if propagated data, intended for the service, was found in a context received with the request. The method is passed the data propagated by the request. In another embodiment the method may be called with null data if null or no data for the service was found in the context.

setResponseData (306)—Called by the Activity service, if specified in the properties returned from getproperties, when processing an inbound response from a remote target and if propagated data, intended for the service, was found in a context received with the response. The method is passed the data propagated. In another embodiment the method may be called with null data if null or no data for the service was found in the context.

requestComplete (307)—Called by the Activity service as part of processing a response to an inbound request from a remote sender if data was propagated, for the HLSLite, with the inbound request. It can be used by the HLSLite to indicate that data received with the inbound request is no longer current. In an alternative embodiment the method is called even if data was not propagated, for the HLSLite, with the inbound request.

As a result of an HLSLite implementing this interface, and the implementation of the Activity Service including support for it, the steps which the HLSLite and the Activity Service must perform to propagate data, are now simplified with respect to the prior art.

Note that a person skilled in the art would realise that there are many ways of defining the HLSLiteDataInterface. For example, getRequestData and getResponseData could be combined into a single method which includes a parameter to indicate whether it was called as a result of a request or a response. Alternatively such a parameter could be omitted if the object which implements the interface tracks the sequence of calls, for example, assuming synchronous request processing, the object would always be called first for a request and second for a response on any given thread.

Figure 4:
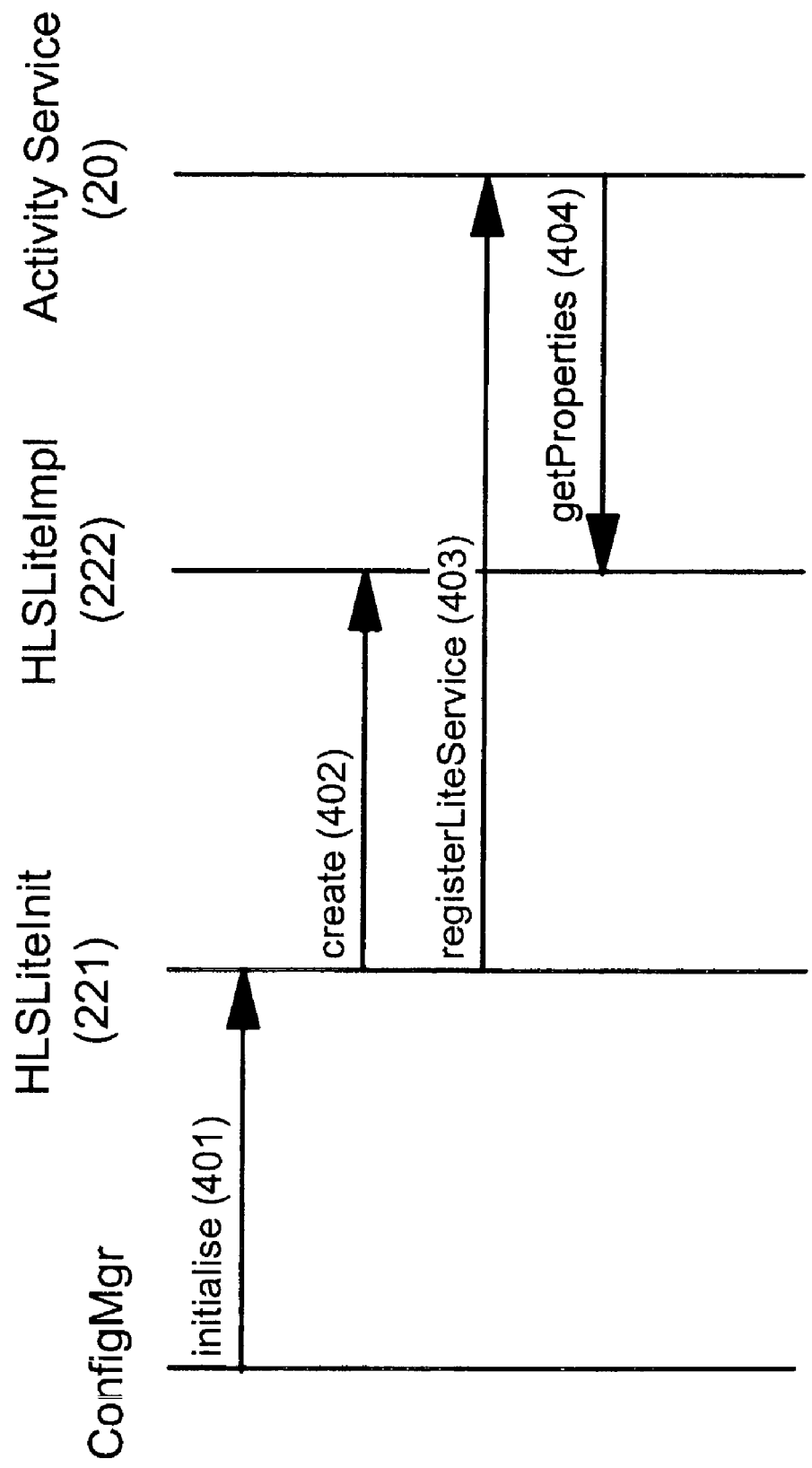
FIG. 4 is a sequence diagram of a HLSLite to registering, with an Activity Service, a requirement to propagate data.

FIG. 4 shows the sequence of flows which are used in the preferred embodiment to enable a HLSLite to register a requirement, with the Activity Service, to be provided with an opportunity to propagate data with every outbound request and response. This sequence is carried out, during start up of the process in which the HLSLite is to execute, as a result of the HLSLite being configured as part of that process. At step 401 the object responsible for configuration of the process, ConfigMgr calls the HLSLiteInit object (221 of FIG. 2) configured to initialise the HLSLite. The HLSLiteInit object then, at step 402, creates the HLSLite-Impl object (222 of FIG. 2) which implements HLSLit-eDataInterface, shown in FIG. 3, for the HLSLite. Note that in another embodiment the HSLiteInit and HLSLiteImpl objects could be implemented, for example, as a single object. At step 403 the HLSLiteInit object calls a register-LiteService method on the Activity Service implementation (20 of FIG. 2), via the extension interface (202 of FIG. 2).

In the preferred embodiment this method is implemented as a static method which means that the reference to it in the HLSLiteInit object is resolved at compile time. In another embodiment the reference to the method could be resolved at runtime, for example by doing a JNDI (Java Naming and Directory Interface) lookup. As part of the registerLiteService call the Activity Service is passed the address of the HLSLiteImpl object and a name for the HLSLite which it implements. This name is used to distinguish the HLSLite from other HLSLites in any processes in which it is registered. This is necessary, for example, to enable data propagated to a remote process to be passed to the correct recipient service. At step 404 the ActivityService object calls the getProperties method of the HLSLiteDataInterface on the HLSLiteImpl object. In the preferred embodiment this method returns a properties object which contains one or more name, value pairs which are used to indicate whether or not each request requires a new globalId to be added to each request and whether or not data is to be propagated with responses to remote requests. The ActivityService object keeps a record of each HLSLite that is registered with it, the record comprising details of the object which implements the HLSLiteDataInterface (HLSLiteImpl in this example), and the name and properties associated with it. Note that in another embodiment the name associated with the HLSLite could be obtained using the getProperties method as opposed to the registerLiteService method.

Figure 5:
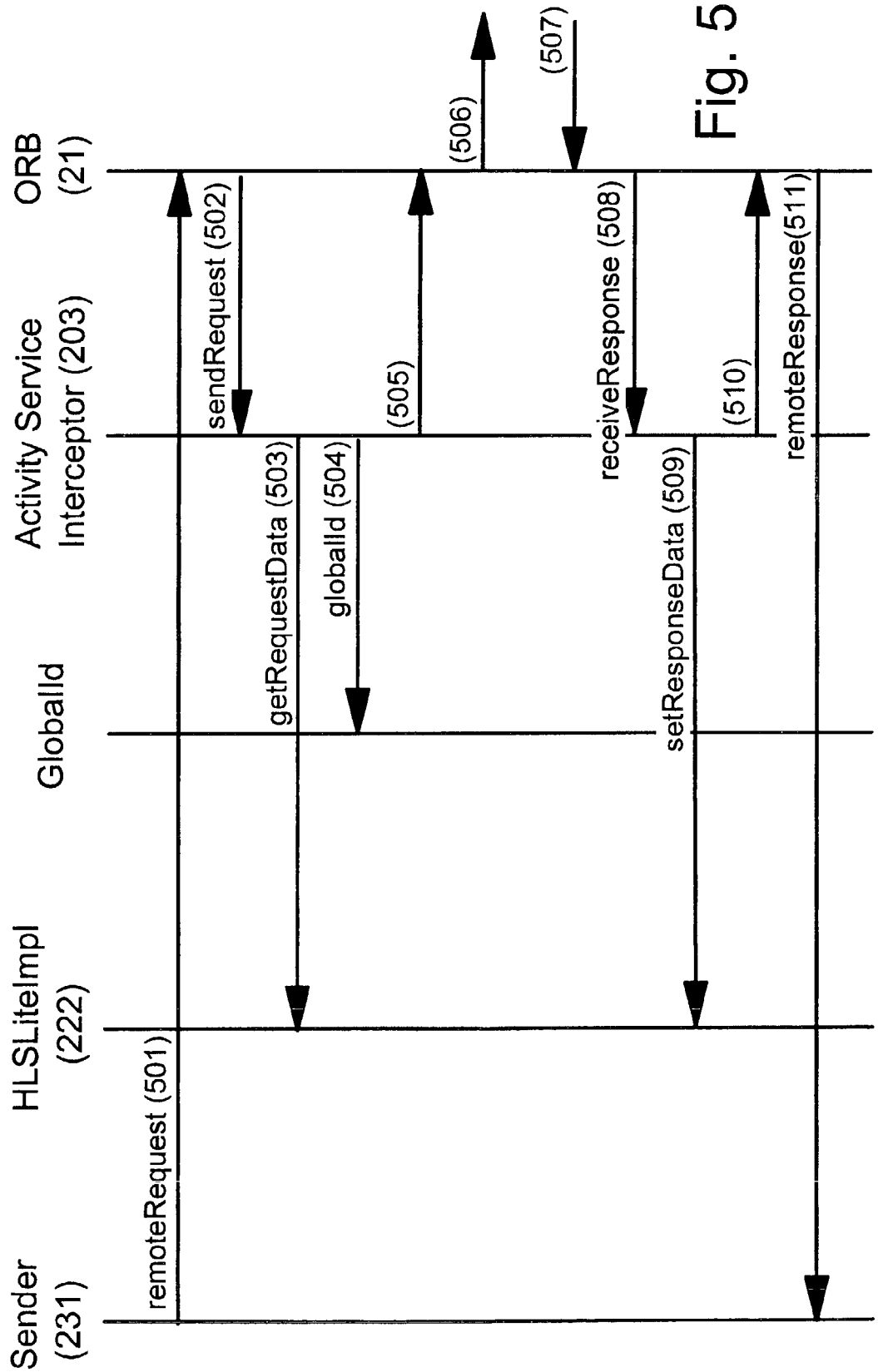
FIG. 5 is a sequence diagram of outbound request and inbound response processing in which a HLSLite propagates and receives data.

FIG. 5 shows an example of a sequence of flows, according to the preferred embodiment of the present invention, carried out in a process from which a request is sent to a remote target. The flows assume that there is only one registered HLSLite service which requires to propagate data and that the Activity Service has previously registered an interceptor object (203 of FIG. 2) with an ORB (21 of FIG. 2) which is the delivery mechanism for the request. The initiator of the request, the Sender object (231 of FIG. 2), sends a request to a remote target object, via the ORB, at step 501. As a result the ORB calls the interceptor object, at step 502, before the request leaves the sending process. The interceptor object looks up details of any HLSLites registered with the Activity Service, of which, in this example, there is only one, creates a context and, at step 503, calls getRequestData on the HLSLiteImpl object to obtain data to propagate with the request. Note that the context comprises one or more areas of storage into which the Activity Service puts it own identifier and any data to be flowed, with a remote flow, on its behalf. Further note that the Activity Service adds data to its context in marshalled form, that is in contiguous storage with details of its data type and, if appropriate, its length. If at step 503 getRequestData returned data to propagate (i.e.: did not return null) and getProperties indicated that a new globalId was required for each request, the interceptor object, at step 504, creates a new globalId. Then, assuming that there is data to propagate, the interceptor object marshalls the data to be propagated, the globalId and the name associated with the HLSLite (provided at step 403 of FIG. 4), and adds it to the context. Note that if more than one HLSLiteImpl object was registered with the Activity Service, steps from 503 would be repeated for all other registered HLSLiteImpl objects, although the information relating to all HLSLites would be marshalled and added into a single context. Further, note that in another embodiment if getRequestData returned null data at step 503, the interceptor object may still marshall and add information to the context comprising the HLSLite name, no or null data, and optionally a globalId. The interceptor object then provides the context for inclusion with the outbound request flow to the ORB, on return, at step 505. The ORB then, at step 506, dispatches the flow to the target system and includes with the remote flow the Activity Service context.

Some time later, at step 507, a remote flow which is the response to the request sent at step 506 is received from the target object. As a result the ORB calls the interceptor object at step 508 and passes to it an Activity Service context received with the flow. The interceptor then inspects the inbound context for propagated data items and for each one it finds it checks to see if the HLSLite name associated with it matches that of a registered HLSLite. When a match is found a check is then made to see the HLSLite requires to receive data propagated with an inbound response and if it does the propagated data is passed to it by calling setResponseData. In this example one propagated data item is found in the context and it is intended for the registered HLSLite. As a result setResponseData is called, at step 509, on the HLSLiteImpl object, passing the propagated data item. Note that if no such data was found in the context setResponseData is not called, although in another embodiment it may be called and passed null data. Note that if more than one HLSLite was registered with the Activity service, this step would be repeated for each HLSLite registered to receive response data and for which propagated data was found in the context. The interceptor then returns to the ORB at step 510 before the ORB delivers the response to the sender object at step 511.

Figure 6:
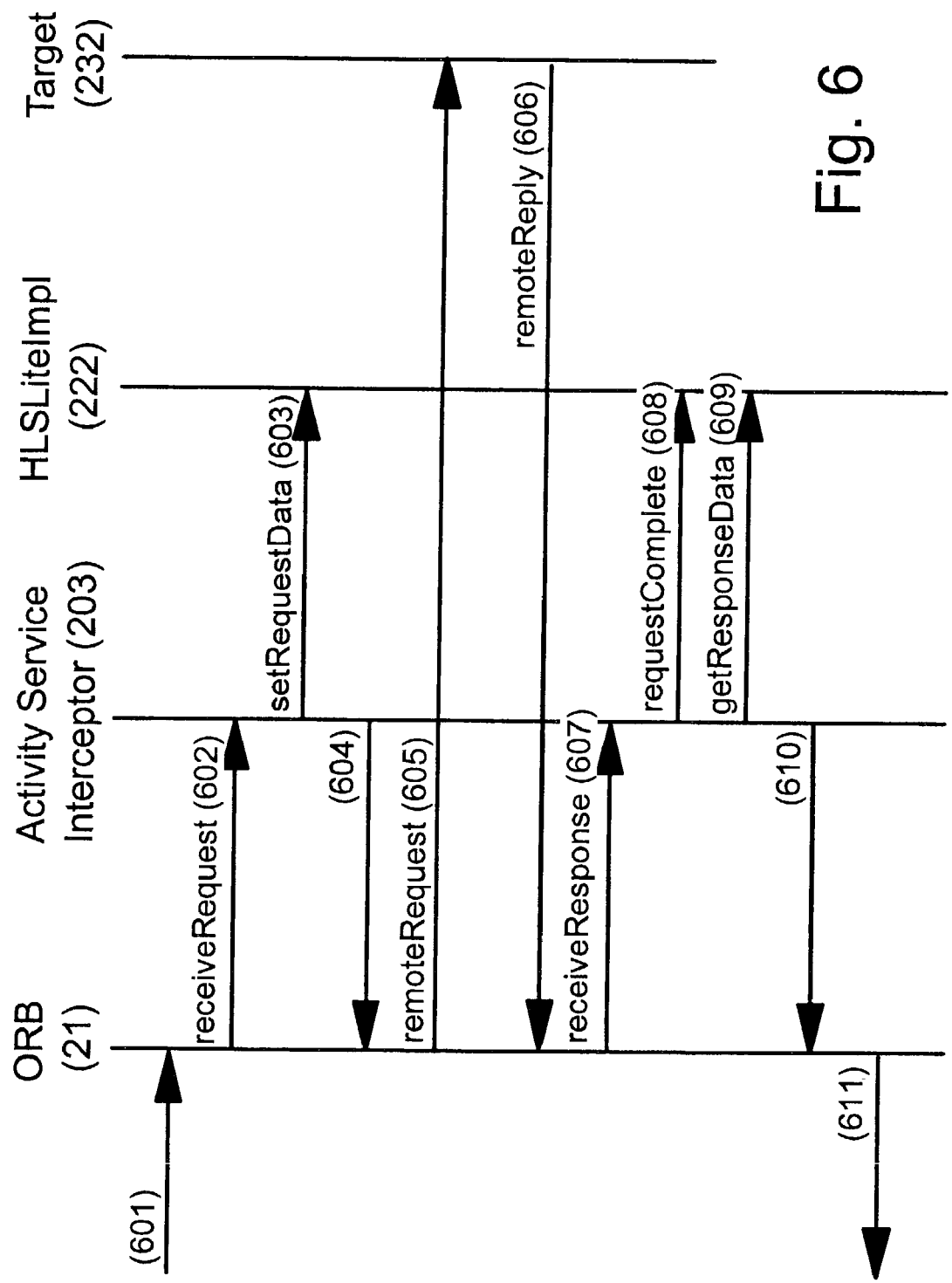
FIG. 6 is a sequence diagram of inbound request and outbound response processing in which a HLSLite receives and propagates data.

FIG. 6 shows an example sequence of flows, according to the preferred embodiment of the present invention, which are carried out in a process which receives an inbound remote request. The flows assume that there is one registered HLSLite in the process which is registered with the same name as the HLSLite of FIG. 5 and that the Activity Service has previously registered an interceptor object (203 of FIG. 2) with an ORB (21 of FIG. 2) which is the delivery mechanism for the request. At step 601 an inbound flow from a remote sender is received which corresponds to the outbound request of FIG. 5 (step 506). As a result the ORB calls the interceptor object at step 602 and as part of the call passes to it the Activity Service context included with the inbound flow. The interceptor object looks up details of any HLSLites registered with the Activity Service, of which, in this example there is only one and then searches the context for data propagated to the registered HLSLite. This search is carried out by comparing the name of the registered HLSLite with the name of the HLSLite that is associated with any propagated data included in the context. When a match is found, at step 603, setRequestData is called on the appropriate HLSLiteImpl object, passing to it the propagated data. Note that if no match is found the HLSLiteImpl object is not called, although in another embodiment setRequestData may be called passing null data. Further note that if more than one HLSLite had been registered with the ActivityService object, step 603 would be repeated for all registered HLSLites. Following this, interceptor returns to the ORB at step 604 which then delivers the request to the target object at step 605. Sometime later, at step 606, the Target object responds (or returns) and as a result the ORB calls the interceptor object at step 607. The interceptor object looks up details of registered HLSLites, although it could have cached the information it obtained after step 602. At step 608, requestComplete is called on the HLSLiteImpl object of the registered HLSLite because it was passed propagated data at step 603. This enables the HLSLite to know that the data it was passed at step 603 has now become stale. Note that in another embodiment requestComplete may be called on the HLSLiteImpl object irrespective of whether or not it was passed propagated data at step 603. Also note that another embodiment support for requestComplete can be omitted.

At this point the Activity Service object has no further work to do on behalf of the registered HLSLite unless the properties obtained from it at step 404 of FIG. 4 indicated that data was to be included on a response. Assuming that this was indicated, at step 609 the interceptor creates an Activity Service context and calls getResponseData on the HLSLiteImpl object. If this call returns data, the Activity Service marshalls the data to be propagated, the globalId received with the request (if present), and the name associated with the HLSLite (obtained a step 403 of FIG. 4), and adds it to the context. Note that in another embodiment getResponseData may not be called if the HLSLite had not received propagated data at step 603. Further note that in another embodiment if getResponseData returned null data at step 609, the interceptor object may still add information to the context comprising the HLSLite name, no or null data, and optionally a globalId. Finally after the interceptor object has made all required calls to the HLSLiteImpl object it provides the context to the ORB, for inclusion with the response flow, on return at step 610. The ORB then, at step 611, dispatches the response to the ORB of the process in which the sender object exists. Note that its arrival is step 507 of FIG. 5.

Thus an example of how an Activity Service and HLSLite service may interact to enable the HLSLite to propagate data with a remote request, without requiring all of the complexities associated with an Activity Service according to the JSR 95, has been illustrated.

There now follows, with reference to FIGS. 7, 8a, 8b, 9a, 9b and 10, a more detailed description of the method followed by the Activity Service, according to the preferred embodiment, in providing this support to one or more HLSLites. Note that the flow charts assume that the Activity Service has registered an interceptor object, with the ORB, which is to be called by the ORB prior to sending out an outbound request or response and prior to delivering an inbound request or response.

FIG. 7 is a flow chart of the method followed during registration of a HLSLite in a process. At step 701 the Activity Service receives a request to register a HLSLite, the request comprises a name to be associated with the HLSLite and details of an object, for example the HLSLiteImpl object (222) of FIG. 2, which provides support for the HLSLiteDataInterface illustrated in FIG. 3. At step 702 the Activity Service calls the getproperties method of the object. This method returns details of whether a new globalId is required for each request, and whether data is required to be included on outbound response flows. At step 703 a check is made to see if the name of the HLSLite has been previously registered to the process. If it has been previously registered, the registration is refused and an error is returned a step 704. However, if the name is unique to the process and has not been previously registered, at step 705 a check is made to see if a globalId should be generated. This will be the case if the properties returned at step 702 indicated that each new request does not require a new globalId, in which case a globalId is generated at step 706 for association with the HLSLite and use with all data propagated by that HLSLite on an outbound request. Whether or not a globalId was generated at step 706, details of the name and object received at step 701, the properties obtained at step 702, and the globalId (if generated at step 706), are stored in a manner that enables later retrieval. In the preferred embodiment this is done with a hash table stored in RAM volatile memory, but in another embodiment a different arrangement could be used, for example an array, or the data could be stored in non-volatile memory, for example a relational database. The method of FIG. 7 is repeated for each HLSLite that registers with the Activity Service and is carried out in any process in which a HLSLite sends and/or receives data with requests.

FIG. 8a is a flow chart of the method followed during the processing of an outbound request. At step 801 the ORB calls the Activity Service to notify it that an outbound request flow is about to leave the process. At step 802 the Activity Service obtains details of registered HLSLites stored at step 707 of FIG. 7. At step 803 a context is created and at step 804 the method of FIG. 8b is followed for each registered HLSLite. Once all registered HLSLites have been processed the Activity Service, at step 805, returns to the ORB and in the process passes the context to the remote delivery mechanism for inclusion with the request flow.

FIG. 8b is a flow chart of the method followed during outbound request processing (according to FIG. 8a) and during outbound response processing (according to FIG. 10). At step 811 the HLSLite is called to obtain data to be propagated with the request. This requires, for outbound request processing calling the getRequestData method, and for outbound response processing calling the getResponseData method. At step 812 a check is made to see if the HLSLite returned any data for propagation. If it did not, processing for the HLSLite stops and data from the HLSLite is not added to the context, although in another embodiment details of the HLSLite could be added to the context but without data. If data was returned at step 811, a check is made at step 813 to see if a new globalId is required. This will be the case if an outbound request is being processed and the properties obtained for the HLSLite (at step 702 of FIG. 7) specified that a new globalId is required with each request. If a new globalId is required one is generated at step 814, otherwise an existing one is obtained at step 815. For an outbound request the existing globalId will be the one generated for the HLSLite at step 706 of FIG. 7, or for an outbound response it will be the one received with the request flow which resulted in this response flow. Finally, the required information which comprises the name associated with the HLSLite, the data returned at step 811, and the globalId, is marshalled and added to the context for delivery with the remote request.

Figure 9B:
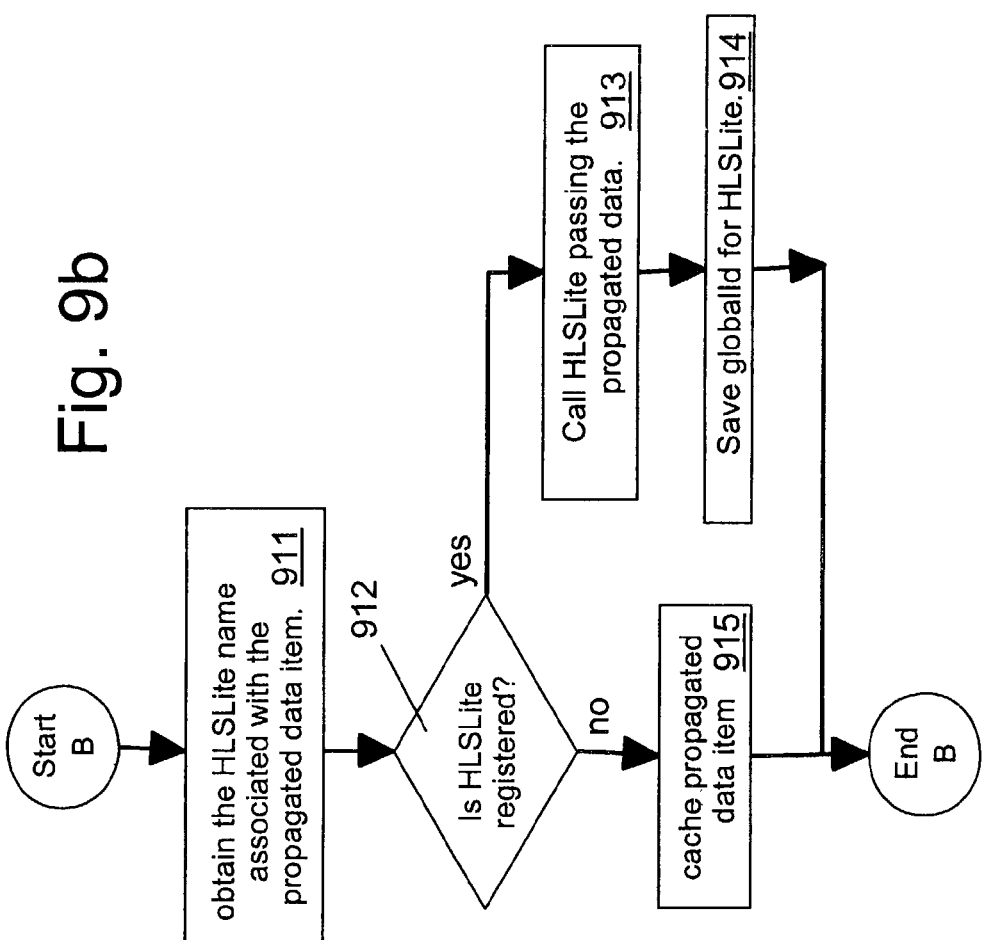
FIG. 9b is a flow chart of a method followed by the Activity Service, on receipt of a context, for each item of propagated data included in the context.
Figure 9A:
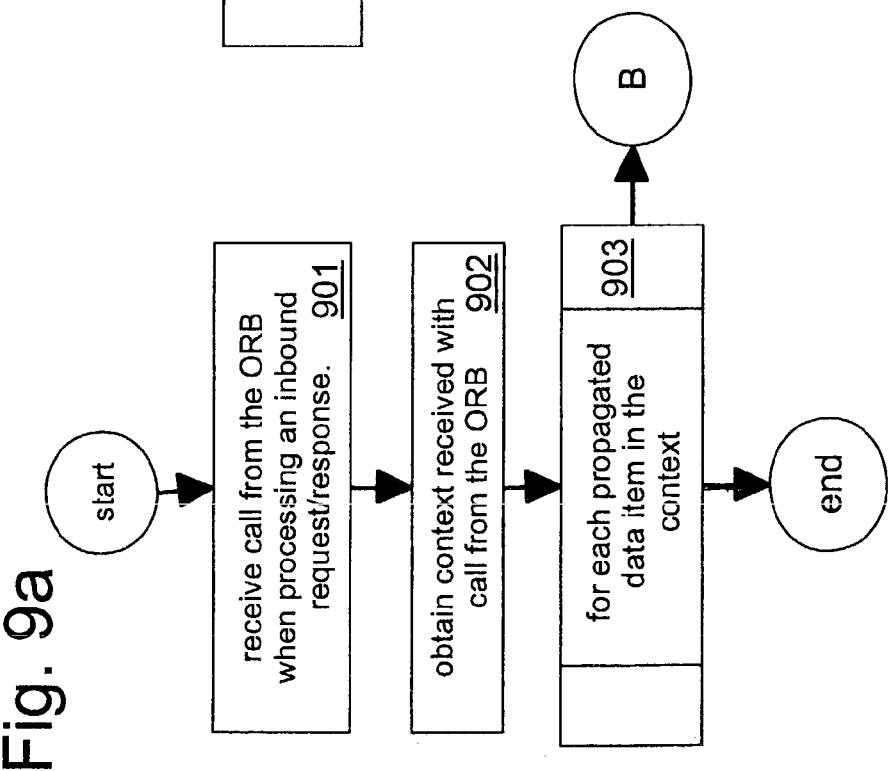
FIG. 9a is a flow chart of a method followed by the Activity Service during inbound request or inbound response processing.

FIG. 9a is a flow chart of the method followed during inbound request or inbound response processing. At step 901 the ORB calls the Activity Service, providing details of a context which was included with a remote request, or response, that has been received. The Activity Service, at step 902, inspects the context for data propagated by one or more HLSLites registered in the remote process, and at step 903, carries out the method of FIG. 9b for each item of propagated data identified.

FIG. 9b is a flow chart of the method followed, on receipt of a context, for each item of propagated data included with the context. This may be used during processing of an inbound request or an inbound response. At step 911, the name of the HLSLite which added the propagated data to the context is obtained from the context. At step 912 a check is made to see if a HLSLite with the same name has been registered in the receiving process. If a matching HLSLite is found the setRequestData or setResponseData method is called, as appropriate at step 913, to pass the received propagated data to the HLSLite. Then, for an inbound request only, the globalId received is saved at step 914. However, if no matching HLSLite is found at step 912 the propagated data is cached at step 915. This enables the Activity Service to forward the data to a downstream process if processing of the inbound request results in an further outbound request being made.

FIG. 10 is a flow chart of the method followed during processing of an outbound response. At step 1001 the ORB calls the Activity Service prior to sending out the response. At step 1002 details of all registered HLSLites are obtained. At step 1003 each of these HLSLites which also received data during processing of the inbound request are processed by, at step 1004, calling requestcomplete on them. An Activity Service context is then created at step 1005. At step 1006 each HLSLite obtained at step 1002 is processed, by, at step 1007, checking to see if the properties for the HLSLite (obtained at step 702 of FIG. 7) indicate that the HLSLite requires to propagate data with an outbound response, and if so executing the process of FIG. 8b. Once all registered HLSLites have been processed the Activity Service, at step 1008, returns to the remote delivery mechanism and in the process passes the context to the remote delivery mechanism for inclusion with the response flow.

Thus the methods used, according to the preferred embodiment, for the Activity Service to handle propagation of data for one or more HLSLites, as part of inbound and outbound processing of remote requests or response, have been described.

A person skilled in the art would realise that the exact sequence of the steps of the methods described in FIGS. 7, 8a, 8b, 9a, 9b, and 10 may vary in other embodiments without departing from the present invention. Some steps could be done in a different order, for example in FIGS. 9a and 9b the context is inspected for a names and the name is then compared with the names of registered HLSLites. In another embodiment the names of a registered HLSLite could be obtained and compared with occurrences of names in the context. Further, for example, in FIG. 7 the name of the HLSLite could be obtained from getProperties at step 702 rather than with a registration request at step 701.

Further a person skilled in the art would understand that there are many programming languages in which the method could be implemented, for example, Java, C++ or C.

Further a person skilled in the art would understand that the method could be implemented in a data processing apparatus with each component of the apparatus performing one or more of the method steps of the method described in FIGS. 7, 8a, 8b, 9a, 9b, and 10.

The present invention thus provides a framework, such as an extension to the CORBA Activity Service, on which a service can propagate data with remote flows between processes. The service registers, with the framework, a requirement to be given the opportunity to propagate data with any outbound flow. As part of the registration the service specifies a name by which it is to be known. During processing of any outbound remote flow the framework creates a context, obtains data to propagate from the registered service, and adds the data and name of the service to the context for inclusion with the remote flow. In the receiving process the framework finds the name and data in the context and passes the data to a service registered with the same name. The framework may support a plurality of registered services in any given process.

The invention claimed is:

1. A method for propagating data by means of an intermediate service in a data processing apparatus comprising:
   an application for initiating outbound flows to a remote entity;
   the intermediate service;

a delivery mechanism for processing outbound flows from the application and for notifying the intermediate service of each outbound flow;

at least one auxiliary service, registrable with the intermediate service, for providing respective data associated with the auxiliary service to be propagated with outbound flows;

the method comprising the steps of:

receiving a respective registration request from each said auxiliary service, each said registration request being received in said intermediate service, each said request comprising a respective name to be associated with the auxiliary service, wherein the registration indicates that the auxiliary service requires to be called during outbound flow processing;

registering each said auxiliary service in said intermediate service responsive to receiving said respective registration request;

receiving a plurality of notifications, said plurality of notifications being received in said intermediate service from the delivery mechanism, each notification relating to a respective outbound flow; and responding to each notification in said intermediate service by:

creating a context corresponding to the respective outbound flow;

identifying a set of registered auxiliary services, each of which has been registered in said intermediate service responsive to a respective registration request, said set comprising at least one auxiliary service;

calling each auxiliary service of said set of registered auxiliary services to request associated data to be propagated with the respective outbound flow;

adding the respective name associated with the auxiliary service and any associated data returned from the calling step to the context; and providing the context to the delivery mechanism for inclusion with the outbound flow to which the context corresponds.

2. A method according to claim 1 wherein the step of adding is responsive to data being returned from the calling step.

3. A method according to claim 1 wherein the method comprises the further step of:

obtaining properties from the auxiliary service;

wherein, if the notification relates to an outbound response flow, the calling and adding steps are responsive to the properties indicating that the auxiliary service requires an opportunity to propagate data with each outbound response flow.

4. A method according to claim 1 wherein the step of responding to each notification comprises the further step of:

responsive to the notification relating to an outbound response flow, calling the auxiliary service to inform it that the outbound response flow is being sent.

5. A method according to claim 1 wherein the method further comprises the step of:

obtaining properties from the auxiliary service;

wherein the step of responding to each notification comprises the further step of:

responsive to the notification relating to an outbound request flow and the properties indicating that a unique identifier should be included with each outbound request flow, creating an identifier which can be used to uniquely identify the outbound request flow and adding the identifier to the context.

6. A method according to claim 1 wherein the method comprises a receiving a registration request step for each of a plurality of auxiliary services and the step of responding to each notification comprises further calling and adding steps for each of the plurality of auxiliary services.

7. A method according to claim 1 wherein the intermediate service is provided as an extension to an Activity Service which specifies use of a CORBA Activity Service context.

8. A method for receiving propagated data by means of an intermediate service in a data processing apparatus comprising:

an application for receiving inbound flows from a remote entity;

the intermediate service;

a delivery mechanism for processing inbound flows for the application and for notifying the intermediate service of each inbound flow;

at least one auxiliary service, registrable with the intermediate service, for receiving respective data associated with the auxiliary service propagated with inbound flows;

the method comprising the steps of:

receiving a respective registration request from each said auxiliary service, each said registration request being received in said intermediate service, each said request comprising a respective name to be associated with the auxiliary service, and wherein the registration indicates that the auxiliary service requires to be called during inbound flow processing;

registering each said auxiliary service in said intermediate service responsive to receiving said respective registration request;

receiving a plurality of notifications, said plurality of notifications being received in said intermediate service from the delivery mechanism, each notification relating to a respective inbound flow and comprising a context; and responding to each notification in said intermediate service by:

identifying a set of registered auxiliary services, each of which has been registered in said intermediate service responsive to a respective registration request, said set comprising at least one auxiliary service;

searching the context for the respective name associated with each auxiliary service of said set of registered auxiliary services; and responsive to finding each respective name associated with an auxiliary service of said set of registered auxiliary services:

obtaining data associated with the respective name from the context; and calling the auxiliary service and, as part of the call, passing to the service the data associated with the respective name obtained from the context.

9. A method according to claim 8 wherein step of responding to each notification comprises the further step of:

responsive to not finding the name associated with the auxiliary service, calling the auxiliary service and as part of the call passing to the auxiliary service an indication that no data was included in the context for the auxiliary service.

10. A method according to claim 8 wherein the method comprises a receiving a registration request step for each of a plurality of auxiliary services and the step of responding to each notification comprises further steps of searching, and steps responsive to finding the name, for each of the plurality of auxiliary services.

11. A method according to claim 8 wherein the intermediate service is provided as an extension to an Activity Service which specifies use of a CORBA Activity Service context.

12. A computer program product for execution in a data processing apparatus, the data processing apparatus comprising:
an application for initiating outbound flows to a remote entity;
an intermediate service;
a delivery mechanism for processing outbound flows from the application and for notifying the intermediate service of each outbound flow;
at least one auxiliary service, registrable with the intermediate service, for providing respective data associated with the auxiliary service to be propagated with outbound flows;
the computer program product comprising instructions for propagating data by means of the intermediate service which, when executed on a data processing apparatus cause the data processing apparatus to carry out a method comprising the steps:
receiving a respective registration request from each said auxiliary service, each said registration request being received in said intermediate service, each said request comprising a respective name to be associated with the auxiliary service, wherein the registration indicates that the auxiliary service requires to be called during outbound flow processing;
registering each said auxiliary service in said intermediate service responsive to receiving said respective registration request;
receiving a plurality of notifications, said plurality of notifications being received in said intermediate service from the delivery mechanism, each notification relating to a respective outbound flow; and
responding to each notification in said intermediate service by:
creating a context corresponding to the respective outbound flow;
identifying a set of registered auxiliary services, each of which has been registered in said intermediate service responsive to a respective registration request, said set comprising at least one auxiliary service;
calling each auxiliary service of said set of registered auxiliary services to request associated data to be propagated with the respective outbound flow;
adding the respective name associated with the auxiliary service and any associated data returned from the calling step to the context; and
providing the context to the delivery mechanism for inclusion with the outbound flow to which the context corresponds.

13. A computer program product according to claim 12 wherein the step of adding is responsive to data being returned from the calling step.

14. A computer program product according to claim 12 wherein the method further comprises the step of:
obtaining properties from the auxiliary service;
wherein, if the notification relates to an outbound response flow, the calling and adding steps are responsive to the properties indicating that the auxiliary service requires an opportunity to propagate data with each outbound response flow.

15. A computer program product according to claim 12 wherein the step of responding to each notification comprises the further step of:
responsive to the notification relating to an outbound response flow, calling the auxiliary service to inform it that the outbound response flow is being sent.

16. A computer program product according to claim 12 wherein the method further comprises the step of:
obtaining properties from the auxiliary service;
and wherein the step of responding to each notification comprises the further step of:
responsive to the notification relating to an outbound request flow and the properties indicating that a unique identifier should be included with each outbound request flow, creating an identifier which can be used to uniquely identify the outbound request flow and adding the identifier to the context.

17. A computer program product according to claim 12 wherein the method comprises a receiving a registration request step for each of a plurality of auxiliary services and the step of responding to each notification comprises further calling and adding steps for each of the plurality of services.

18. A computer program product according to claim 12 wherein the intermediate service is provided as an extension to an Activity Service which specifies use of a CORBA Activity Service context.

19. A computer program product for execution in a data processing apparatus, the data processing comprising:
an application for receiving inbound flows from a remote entity;
an intermediate service;
a delivery mechanism for processing inbound flows for the application and for notifying the intermediate service of each inbound flow;
at least one auxiliary service, registrable with the intermediate service, for receiving respective data associated with the auxiliary service propagated with inbound flows;
the computer program product comprising instructions for receiving propagated data by means of the intermediate service, which when executed on the data processing apparatus cause the data processing apparatus to carry out a method comprising the steps of:
receiving a respective registration request from each said auxiliary service, each said registration request being received in said intermediate service, each said request comprising a respective name to be associated with the auxiliary service, and wherein the registration indicates that the auxiliary service requires to be called during inbound flow processing;
registering each said auxiliary service in said intermediate service responsive to receiving said respective registration request;
receiving a plurality of notifications, said plurality of notifications being received in said intermediate service from the delivery mechanism, each notification relating to a respective inbound flow and comprising a context; and
responding to each notification in said intermediate service by: identifying a set of registered auxiliary services, each of which has been registered in
said intermediate service responsive to a respective registration request, said set comprising
at least one auxiliary service;
searching the context for the respective name associated with each auxiliary service of said set of registered auxiliary services; and responsive to finding each respective name associated with an auxiliary service of said set of registered auxiliary services:
  obtaining data associated with the respective name from the context; and
  calling the auxiliary service and, as part of the call, passing to the service the data associated with the respective name obtained from the context.

20. A computer program product according to claim 19 wherein step of responding to each notification comprises the further step of:
  responsive to not finding the name associated with the auxiliary service, calling the auxiliary service and as part of the call passing to the auxiliary service an indication that no data was included in the context for the auxiliary service.

21. A computer program product according to claim 19 wherein the method further comprises a receiving a registration request step for each of a plurality of auxiliary services and the step of responding to each notification comprises further steps of searching, and steps responsive to finding the name, for each of the plurality of auxiliary services.

22. A computer program product according to claim 19 wherein the intermediate service is provided as an extension to an Activity Service which specifies use of a CORBA Activity Service context.

23. A data processing apparatus comprising:
  at least one processor for executing programs;
  a network connector for communicating with a plurality of remote entities over a network;
  an application executable on said at least one processor, said application initiating outbound flows to at least one remote entity;
  an intermediate service executable on said at least one processor;
  a delivery mechanism executable on said at least one processor, said delivery mechanism receiving outbound flows from said application for transmission over said network by said network connector to said at least one remote entity;
  at least one auxiliary service executable on said at least one processor and registrable with said intermediate service, each said auxiliary service providing respective data associated with the auxiliary service to be propagated with outbound flows;
  wherein said intermediate service registers each said auxiliary service responsive to receiving a respective registration request from the auxiliary service, each said request comprising a respective name to be associated with the auxiliary service, wherein the registration indicates that the auxiliary service is required to be called during outbound flow processing;
  wherein said delivery mechanism provides a respective notification to said intermediate service of each of a plurality of outbound flows;
  wherein said intermediate service responds to each said notification by: (a) creating a context corresponding to the respective outbound flow; (b) identifying a set of registered auxiliary services, each of which has been registered in said intermediate service responsive to a respective registration request, said set comprising at least one auxiliary service; (c) calling each auxiliary service of said set of registered auxiliary services to request associated data to be propagated with the respective outbound flow; (d) adding the respective name associated with the auxiliary service and any associated data returned from the calling step to the context; and (e) providing the context to the delivery mechanism; and
  wherein said delivery mechanism responds to receiving a context corresponding to an outbound flow from said intermediate service by including data from said context in the corresponding outbound flow.

24. The data processing apparatus of claim 23 wherein said intermediate service obtains respective properties from each said auxiliary service during registration.

25. The data processing apparatus of claim 23 wherein the intermediate service is provided as an extension to an Activity Service which specifies use of a CORBA Activity Service context.

* * * * *